United States Patent
Reddy et al.

(10) Patent No.: US 8,513,167 B2
(45) Date of Patent: Aug. 20, 2013

(54) METHODS OF USING POLYSACCHARIDE BASED CEMENT ADDITIVES

(75) Inventors: B. Raghava Reddy, Duncan, OK (US); Anindya Ghosh, Duncan, OK (US); Russell M. Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/460,533

(22) Filed: Apr. 30, 2012

(65) Prior Publication Data

US 2012/0214712 A1   Aug. 23, 2012

Related U.S. Application Data

(62) Division of application No. 11/755,270, filed on May 30, 2007.

(51) Int. Cl.
  *C09K 8/68* (2006.01)
  *C09K 8/60* (2006.01)
  *C08B 37/00* (2006.01)
  *E21B 33/00* (2006.01)

(52) U.S. Cl.
  USPC ........... 507/209; 507/110; 507/211; 507/214; 166/293

(58) Field of Classification Search
  USPC ................ 507/110, 209, 211, 214; 166/293
  See application file for complete search history.

(56) References Cited

U.S. PATENT DOCUMENTS

| | | | |
|---|---|---|---|
| 2,662,024 A | 12/1953 | Riddell et al. | |
| 3,046,272 A | 7/1962 | Strating et al. | |
| 3,359,225 A | 12/1967 | Weisend | |
| 3,411,926 A | 11/1968 | Gogek et al. | |
| 3,414,467 A | 12/1968 | Ferrara | |
| 3,467,647 A | 9/1969 | Benninga | |
| 3,503,768 A | 3/1970 | Previte | |

(Continued)

FOREIGN PATENT DOCUMENTS

DE   10021476 A1   10/2001
DE   10209812 A1   9/2002

(Continued)

OTHER PUBLICATIONS

"Catalysis of Hydrogen Peroxide Oxidation of Carbohydrates by Iron and Copper Salts", Proceedings of the Oklahoma Academy of Science for 1943, p. 53 (Gastineau).*

(Continued)

*Primary Examiner* — Ling-Siu Choi
*Assistant Examiner* — Aiqun Li
(74) *Attorney, Agent, or Firm* — Craig W. Roddy; Conley Rose, P.C.

(57) ABSTRACT

A method of servicing a wellbore comprising introducing to the wellbore a wellbore servicing fluid comprising an additive composition comprising a polysaccharide having carboxylate and sulfonate groups. A method of servicing a wellbore comprising preparing at the well site an additive composition comprising a polysaccharide having carboxylate and sulfonate groups, introducing the additive composition into a wellbore servicing fluid, and placing the wellbore servicing fluid into a subterranean formation. A method of preparing a wellbore servicing fluid comprising contacting a polysaccharide composition with an oxidizing agent to form an oxidized polysaccharide, and contacting the oxidized polysaccharide with a sulfonating agent to form a carboxylated sulfonated polysaccharide, and contacting the carboxylated sulfonated polysaccharide with a wellbore servicing fluid.

21 Claims, 5 Drawing Sheets

(56) References Cited

U.S. PATENT DOCUMENTS

| | | | |
|---|---|---|---|
| 4,021,355 | A | 5/1977 | Holtmyer et al. |
| 4,033,415 | A | 7/1977 | Holtmyer et al. |
| 4,061,611 | A | 12/1977 | Glowaky et al. |
| 4,199,484 | A | 4/1980 | Murphey |
| 4,216,829 | A | 8/1980 | Murphey |
| 4,233,162 | A | 11/1980 | Carney |
| 4,259,205 | A | 3/1981 | Murphey |
| 4,368,136 | A | 1/1983 | Murphey |
| 4,466,837 | A | 8/1984 | Chatterji et al. |
| 4,486,317 | A | 12/1984 | Sandell |
| 4,522,653 | A | 6/1985 | Rao et al. |
| 4,524,003 | A | 6/1985 | Borchardt |
| 4,557,763 | A | 12/1985 | George et al. |
| 4,707,187 | A | 11/1987 | Tsuda et al. |
| 4,818,288 | A | 4/1989 | Aignesberger et al. |
| 4,841,040 | A | 6/1989 | Just et al. |
| 4,883,125 | A | 11/1989 | Wilson et al. |
| 4,941,536 | A | 7/1990 | Brothers et al. |
| 4,982,793 | A | 1/1991 | Holtmyer et al. |
| 5,049,288 | A | 9/1991 | Brothers et al. |
| 5,067,565 | A | 11/1991 | Holtmyer et al. |
| 5,105,885 | A | 4/1992 | Bray et al. |
| 5,122,549 | A | 6/1992 | Holtmyer et al. |
| 5,213,161 | A | 5/1993 | King et al. |
| 5,220,960 | A | 6/1993 | Totten et al. |
| 5,247,086 | A | 9/1993 | Cain et al. |
| 5,281,270 | A | 1/1994 | Totten et al. |
| 5,292,367 | A | 3/1994 | Bloys et al. |
| 5,298,069 | A | 3/1994 | King et al. |
| 5,304,620 | A | 4/1994 | Holtmyer et al. |
| 5,346,012 | A | 9/1994 | Heathman et al. |
| 5,472,051 | A | 12/1995 | Brothers |
| 5,484,019 | A | 1/1996 | Griffith |
| 5,536,311 | A | 7/1996 | Rodrigues |
| 5,588,488 | A | 12/1996 | Vijn et al. |
| 5,613,558 | A | 3/1997 | Dillenbeck, III |
| 5,641,584 | A | 6/1997 | Andersen et al. |
| 5,658,380 | A | 8/1997 | Dillenbeck, III |
| 5,900,053 | A | 5/1999 | Brothers et al. |
| 5,913,364 | A | 6/1999 | Sweatman |
| 6,019,835 | A | 2/2000 | Chatterji et al. |
| 6,096,524 | A | 8/2000 | Shi et al. |
| 6,124,244 | A | 9/2000 | Murphey |
| 6,143,069 | A | 11/2000 | Brothers et al. |
| 6,167,967 | B1 | 1/2001 | Sweatman |
| 6,170,575 | B1 | 1/2001 | Reddy et al. |
| 6,182,758 | B1 | 2/2001 | Vijn |
| 6,258,757 | B1 | 7/2001 | Sweatman et al. |
| 6,273,191 | B1 | 8/2001 | Reddy et al. |
| 6,319,312 | B1 | 11/2001 | Luongo |
| 6,332,921 | B1 | 12/2001 | Brothers et al. |
| 6,379,446 | B1 | 4/2002 | Andersen et al. |
| 6,457,524 | B1 | 10/2002 | Roddy |
| 6,488,763 | B2 | 12/2002 | Brothers et al. |
| 6,626,242 | B2 | 9/2003 | D'Almeida et al. |
| 6,664,215 | B1 | 12/2003 | Tomlinson |
| 6,681,856 | B1 | 1/2004 | Chatterji et al. |
| 6,764,981 | B1 | 7/2004 | Eoff et al. |
| 6,844,296 | B2 | 1/2005 | Dawson et al. |
| 6,887,833 | B2 | 5/2005 | Brothers et al. |
| 6,893,497 | B2 | 5/2005 | Einfeldt et al. |
| 6,981,552 | B2 | 1/2006 | Reddy et al. |
| 7,007,752 | B2 | 3/2006 | Reddy et al. |
| 7,044,222 | B2 | 5/2006 | Tomlinson |
| 7,077,203 | B1 | 7/2006 | Roddy et al. |
| 7,174,962 | B1 | 2/2007 | Roddy et al. |
| 7,199,086 | B1 | 4/2007 | Roddy et al. |
| 7,204,307 | B2 | 4/2007 | Roddy et al. |
| 7,213,646 | B2 | 5/2007 | Roddy et al. |
| 7,273,100 | B2 | 9/2007 | Reddy et al. |
| 7,297,207 | B2 | 11/2007 | Reddy et al. |
| 7,727,945 | B2 | 6/2010 | Rodrigues et al. |
| 2002/0103370 | A1* | 8/2002 | Doherty et al. ........ 536/119 |
| 2004/0182576 | A1 | 9/2004 | Reddy et al. |
| 2006/0151172 | A1 | 7/2006 | Hanes, Jr. et al. |
| 2007/0015678 | A1* | 1/2007 | Rodrigues et al. ........ 510/320 |
| 2008/0021167 | A1* | 1/2008 | Rodrigues ........ 525/242 |
| 2008/0300149 | A1 | 12/2008 | Reddy et al. |
| 2008/0300150 | A1 | 12/2008 | Reddy et al. |

FOREIGN PATENT DOCUMENTS

| | | |
|---|---|---|
| EP | 0879826 A1 | 11/1998 |
| EP | 1081112 A1 | 3/2001 |
| EP | 1081113 A1 | 3/2001 |
| EP | 1375819 A1 | 1/2004 |
| GB | 879133 | 10/1961 |
| GB | 1183688 | 3/1970 |
| JP | 10298203 A | 11/1998 |
| JP | 11012301 | 1/1999 |
| WO | 03002479 A1 | 1/2003 |

OTHER PUBLICATIONS

ACS abstract of JP 10298203, 2007, 1 page, ACS on STN.
ACS abstract of JP 11012301, 2007, 1 page, ACS on STN.
Cargill Food & Pharma Specialties—North America, "Cargill Dry MD™ 01960," Technical Information, Jan. 3, 2003, 2 pages, Cargill, Inc.
Foreign communication from a related counterpart application—International Search Report, PCT/GB2004/001503, Jul. 12, 2004, 3 pages.
Foreign communication from a related counterpart application—International Search Report and Written Opinion, PCT/GB2008/001774, Sep. 24, 2008, 16 pages.
Halliburton brochure entitled, "CFR-2 cement friction reducer," 1999, 2 pages, Halliburton Energy Services, Inc.
Halliburton brochure entitled "CFR-3 cement friction reducer—dispersant," 1998, 2 pages, Halliburton Energy Services, Inc.
Halliburton brochure entitled, "CFR-3™ cement friction reducer—dispersant," Oct. 2005, 1 page.
Halliburton brochure entitled, "SCR-100™ cement retarder," May 2006, 1 page.
Halliburton brochure entitled "ThermaLock™ cement—for corrosive CO2 environments," Jun. 1999, 2 pages, Halliburton Energy Services, Inc.
McCabe, M. A., et al., "Chemical bridging for well control during stimulation and workover operations," SPE International Sumposium on Oilfield Chemistry, SPE 21037, Feb. 20-22, 1991, pp. 385-391, Society of Petroleum Engineers, Inc.
McKillop, Alexander, et al., "Sodium perborate and sodium percarbonate: cheap, safe and versatile oxidising agents for organic synthesis," 1995, Tetrahedron, vol. 51, No. 22, pp. 6145-6166, Elsevier Science, Ltd.
Advisory Action dated Mar. 3, 2010 (5 pages), U.S. Appl. No. 11/755,270, filed May 30, 2007.
Advisory Action dated Mar. 8, 2010 (5 pages), U.S. Appl. No. 11/755,271, filed May 30, 2007.
Advisory Action dated Oct. 7, 2011 (5 pages), U.S. Appl. No. 11/755,270, filed May 30, 2007.
Advisory Action dated Oct. 11, 2011 (5 pages), U.S. Appl. No. 11/755,271, filed May 30, 2007.
Office Action dated Jul. 29, 2009 (17 pages), U.S. Appl. No. 11/755,271, filed May 30, 2007.
Office Action dated Jul. 30, 2009 (20 pages), U.S. Appl. No. 11/755,270, filed May 30, 2007.
Office Action (Final) dated Dec. 23, 2009 (15 pages), U.S. Appl. No. 11/755,270, filed May 30, 2007.
Office Action dated Dec. 24, 2009 (14 pages), U.S. Appl. No. 11/755,271, filed May 30, 2007.
Office Action dated Apr. 11, 2011 (13 pages), U.S. Appl. No. 11/755,270, filed May 30, 2007.
Office Action dated Apr. 19, 2011 (15 pages), U.S. Appl. No. 11/755,271, filed May 30, 2007.
Office Action dated Aug. 16, 2011 (12 pages), U.S. Appl. No. 11/755,270, filed May 30, 2007.
Office Action (Final) dated Aug. 16, 2011 (16 pages), U.S. Appl. No. 11/755,271, filed May 30, 2007.
Office Action dated May 3, 2012 (13 pages), U.S. Appl. No. 11/755,271, filed May 30, 2007.

Office Action dated May 4, 2012 (17 pages), U.S. Appl. No. 11/755,270, filed May 30, 2007.

Reddy, B. R., et al., "A natural polymer-based crosslinker system for conformance gel systems," SPE/DOE Improved Oil Recovery Symposium, SPE 75163, Apr. 13-17, 2002, pp. 1-11, Society of Petroleum Engineers Inc.

Office Action (Final) dated Aug. 22, 2012 (17 pages), U.S. Appl. No. 11/755,270, filed May 30, 2007.

Office Action (Final) dated Aug. 22, 2012 (12 pages), U.S. Appl. No. 11/755,271, filed May 30, 2007.

Advisory Action dated Nov. 6, 2012 (3 pages), U.S. Appl. No. 11/755,270, filed May 30, 2007.

Advisory Action dated Nov. 7, 2012 (3 pages), U.S. Appl. No. 11/755,271, filed May 30, 2007.

\* cited by examiner

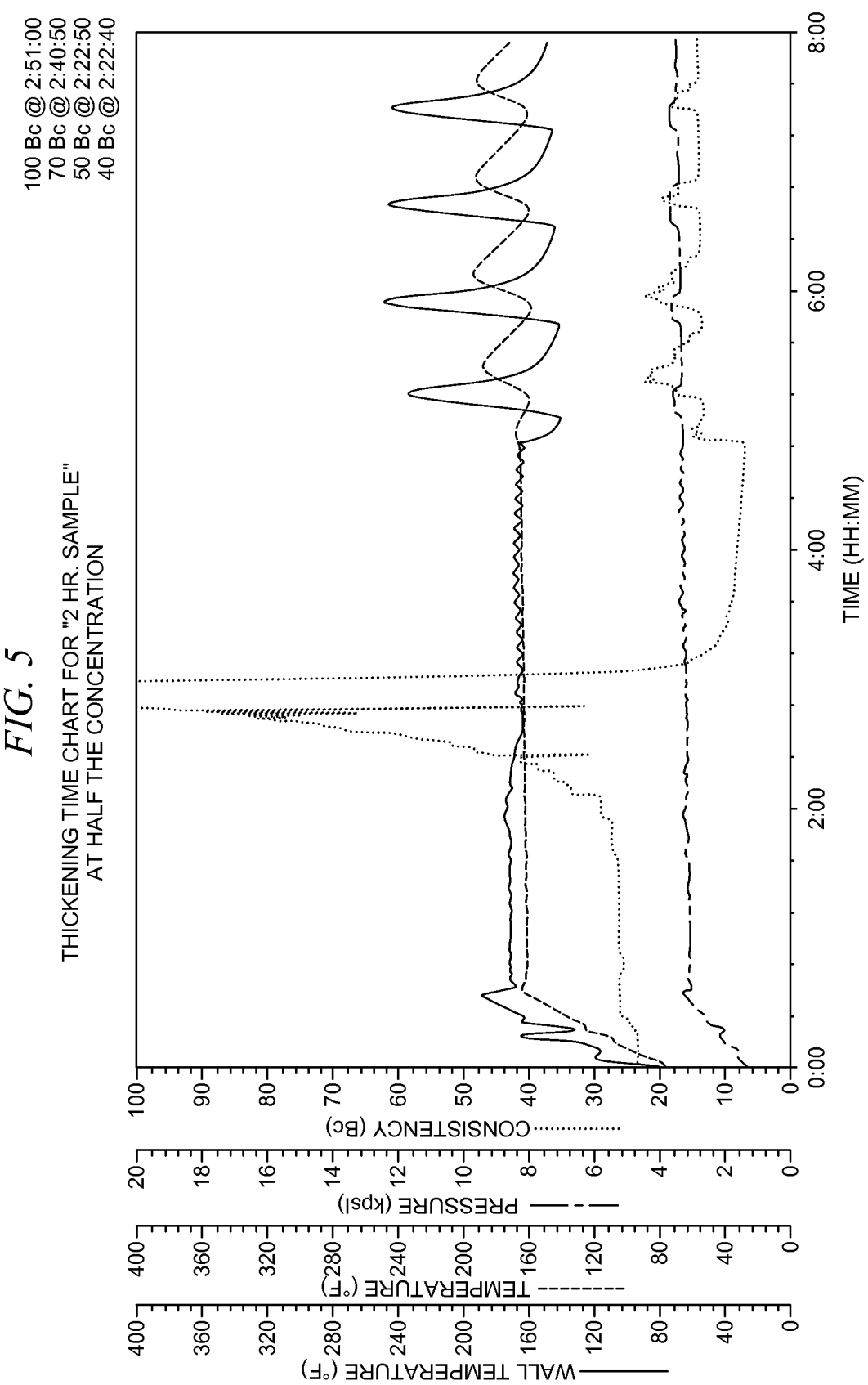

METHODS OF USING POLYSACCHARIDE BASED CEMENT ADDITIVES

CROSS-REFERENCE TO RELATED APPLICATIONS

This application is a divisional of and claims priority to U.S. patent application Ser. No. 11/755,270 filed on May 30, 2007, published as U.S. 2008/0300150 A1 and entitled "Methods of Using Polysaccharide Based Cement Additives," which is incorporated herein by reference in its entirety. The subject matter of the present application is related to U.S. application Ser. No. 11/205,920 filed Aug. 16, 2008, now U.S. Pat. No. 7,297,207 B2, entitled "Biodegradable Dispersants for Cement Compositions and Methods of Cementing in Subterranean Formations" and U.S. application Ser. No. 11/755,271 published as U.S. 2008/0300149 and entitled "Polysaccharide Based Cement Additives" which are hereby incorporated by reference in their entirety for all purposes.

STATEMENT REGARDING FEDERALLY SPONSORED RESEARCH OR DEVELOPMENT

Not applicable.

BACKGROUND OF THE INVENTION

1. Field of the Invention

This disclosure relates to servicing a wellbore. More specifically, it relates to servicing a wellbore with compositions comprising a polysaccharide based cement additive and methods of making same.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Wellbore servicing fluids (e.g., cement slurries, fracturing fluids, drilling fluids) are often modified to allow them to function for their intended purpose under a variety of conditions. These modifications typically involve the inclusion of additives in the wellbore servicing fluids. For example, cement compositions can be modified using additives such as dispersants, fluid loss control agents, viscosifiers, premature gelation inhibitors, transition time modifiers and the like.

Additives such as dispersants and fluid loss control agents are often formulated from materials that are deemed environmentally unacceptable for use in locations subject to stringent environmental regulations. Their status as unacceptable environmental materials stems from their inability to undergo complete biodegradation in the environment which may result in undesirable effects if the materials are released into the environment or if they accumulate in animal and plant tissues for long periods. Thus, it would be desirable to develop biodegradable additives that function as dispersants, fluid loss agents, viscosifiers, gelation inhibitors, transition time modifiers and the like.

SUMMARY OF THE PREFERRED EMBODIMENTS

Disclosed herein is a method of servicing a wellbore comprising introducing to the wellbore a wellbore servicing fluid comprising an additive composition comprising a polysaccharide having carboxylate and sulfonate groups.

Also disclosed herein is a method of servicing a wellbore comprising preparing at the well site an additive composition comprising a polysaccharide having carboxylate and sulfonate groups, introducing the additive composition into a wellbore servicing fluid, and placing the wellbore servicing fluid into a subterranean formation.

Further disclosed herein is a method of preparing a wellbore servicing fluid comprising contacting a polysaccharide composition with an oxidizing agent to form an oxidized polysaccharide, and contacting the oxidized polysaccharide with a sulfonating agent to form a carboxylated sulfonated polysaccharide, and contacting the carboxylated sulfonated polysaccharide with a wellbore servicing fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the disclosure, reference will now be made to the accompanying drawings in which:

FIG. 5 is a thickening time plot of a cement sample from Example 1.

DETAILED DESCRIPTION OF THE PREFERRED EMBODIMENTS

Disclosed herein are additive compositions and methods of making and using same. In an embodiment, the additive compositions comprise polysaccharides such as for example starch or cellulose. The polysaccharides may be modified as disclosed herein to produce additive compositions having different functions. In some embodiments, a single additive composition may be prepared so as to have at least two functional groups. The additive compositions disclosed herein may be prepared just prior to use in physical proximity to their end-use location. Alternatively, such compositions may be prepared and stored for use at some later time and/or at a location not proximate to their end-use location. In an embodiment, the additive compositions disclosed herein are included in wellbore servicing fluids to modify the properties of said fluids. Examples of wellbore servicing fluids include, but are not limited to, cement slurries, non-cementitious sealants, drilling fluids or muds, spacer fluids, fracturing fluids or completion fluids, all of which are well known in the art.

Figure 1:
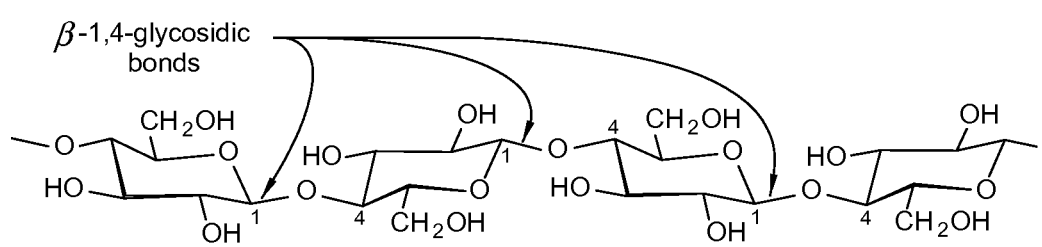
FIG. 1 is the chemical structure of cellulose.

In an embodiment, the additive composition comprises a polysaccharide. Polysaccharides are relatively complex carbohydrates composed of monosaccharides joined together via glycosidic linkages as shown in FIG. 1 for a polysaccharide, cellulose. Examples of suitable polysaccharides include, but are not limited to, natural or derivatized polysaccharides that are soluble, dispersible, or swellable in an aqueous liquid (for example starches), gums (for example galactomannan gums such as guar gum), celluloses and derivatives thereof, and combinations thereof.

In an embodiment, the polysaccharide comprises starch. Starch consists of two types of molecules, amylose which normally comprises 20-30% of the starch and amylopectin which normally comprises 70-80% of the starch. Both consist of polymers of α-D-glucose units. In amylose the glucose monomers are linked (1→4), whereas in amylopectin about one glucose residue in about every twenty is also linked (1→6) forming branch-points. The relative proportions of amylose to amylopectin and consequently (1→6) branch-points both depend on the source of the starch, for example amylomaizes contain over 50% amylose whereas 'waxy' maize may have almost none (0 to <10%). The solubility in water at room temperature increases with higher amylopectin content and may be more suitable when concentrated solutions are needed. In an embodiment, a starch suitable for use in accordance with the present disclosure may be obtained from renewable glucose sources such as potatoes, corn, maize, tapioca, cereal grains, or combinations thereof.

In an alternative embodiment, the polysaccharide comprises a galactomannan gum. Galactomannans are polysaccharides consisting of a mannose backbone with galactose side groups. Specifically, a (1-4)-linked beta-D-mannopyranose backbone with branchpoints from their 6-positions linked to alpha-D-galactose, i.e. 1-6-linked alpha-D-galactopyranose. Examples of galatctomann gums include without limitation guar gum, locust bean gum, gum ghatti, gum karaya, tamarind gum, tragacanth gum, or combinations thereof.

In an alternative embodiment, the polysaccharide comprises cellulose. Cellulose is a straight chain polymer of beta-glucose monomeric units. In an embodiment, the cellulose is modified or derivatized, for example hydroxyethylated, alternatively the cellulose is unmodified.

In an embodiment, a polysaccharide suitable for use in this disclosure has a molecular weight ranging from about 500 Daltons to about 1,000,000 Daltons, alternatively from about 700 to about 500,000, alternatively from about 1000 to about 200,000. The polysaccharide may be present in the additive composition solution in an amount of from about 3 to about 50%, alternatively from about 5 to about 40%, alternatively from about 10 to about 35% by weight of the additive composition.

In an embodiment, the additive composition comprises a polysaccharide composition that has been modified to introduce anionic functionalities wherein the anionic functionalities comprise carboxylate and sulfonate groups. In an embodiment, a method for preparation of the additive composition comprises contacting a polysaccharide composition with an oxidizing agent to form a partially carboxylated, oxidized polysaccharide composition and contacting the partially carboxylated, oxidized polysaccharide composition with a sulfonating agent to form a carboxylated, sulfonated polysaccharide composition. The carboxylated, sulfonated polysaccharide composition may then be used as an additive composition to modify the properties of a wellbore servicing fluid or may be further processed, as will be described in more detail later herein.

In an embodiment, a method for the preparation of an additive composition comprises contacting a polysaccharide composition with an oxidizing agent. Contacting of the polysaccharide composition with an oxidizing agent may result in the cleavage of glycosidic linkages or hydroxylated carbon-carbon bonds (for example, $C_2$-$C_3$ bonds) or isolated alcohol groups (for example, $C_6$—OH bonds) within the polysaccharide and result in the formation of reactive carbonyl-containing groups including carboxylic acid groups, ketones, aldehydes, anhydrides, and ester groups. It is to be understood that when the $C_2$-$C_3$ bonds are cleaved due to oxidation, the cyclic structure of the monosaccharide group becomes acyclic, whereas when an isolated alcohol group is oxidized the cyclic structure of the monosaccharide is retained. Oxidation of the glycosidic linkage may result in lower molecular weight fragments containing either acyclic and/or cyclic oxidized monosaccharide fragments. An oxidizing agent suitable for use in this disclosure may comprise any material capable of oxidizing a polysaccharide of the type disclosed herein to generate carbonyl-containing groups. The oxidizing agent may further be characterized by the ability to react with a polysaccharide and produce by-products that cannot further oxidize the polysaccharide compositions. Use of such oxidizing agents may result in an increased product stability over a long time period, for example during storage of the polysaccharide compositions. This is in contrast to oxidizing agents, for example, periodate and chlorite salts, which upon initial oxidation of polysaccharides, form by-products (e.g., iodate and hypochlorite salts) which may detrimentally further oxidize the polysaccharide composition during storage. Suitable oxidizing agents may comprise hydrogen peroxide or contain a peroxy bond (—O—O—) and release hydrogen peroxide upon reaction with water. In an embodiment, the oxidizing agent comprises hydrogen peroxide. Alternatively, the oxidizing agent comprises a salt having X waters of crystallization wherein X is equal to or greater than 1 and wherein at least one of the waters of crystallization has been replaced with hydrogen peroxide. Such salts may be represented by the general formula $Y \cdot nH_2O \cdot mH_2O_2$ wherein Y is a salt, n is equal to or greater than zero and m is equal to or greater than 1. In an embodiment, the oxidizing agent comprises sodium percarbonate, $Na_2CO_3 \cdot 1.5H_2O_2$. Examples of oxidizing agents which contain peroxy bond and release hydrogen peroxide only upon reaction with water include without limitation perphoshate $[(P_2O_8)^{4-}]$, persulfate $[(S_2O_8)^{2-}]$, and perborate $[(BO_3)^-]$ salts of alkali, alkaline earth metals and ammonium ion.

As will be understood by one of ordinary skill in the art, the extent of oxidation of the polysaccharide may be adjusted by varying the reaction conditions (e.g. oxidizing agent, reaction time, reaction temperature). The extent of oxidation refers to the number of cleaved bonds such as the number of glycosidic linkages, hydroxylated carbon-carbon bonds (for example, $C_2$-$C_3$ bonds) or isolated alcohol group bonds (for example, $C_6$—OH bond); the percent of monosaccharide rings oxidized; the number of alcohol groups oxidized per ring; and also to the nature of the functional groups generated. The percent of monosaccharide rings oxidized per polysaccharide chain in the polysaccharide composition may range from about 1% to about 30%, alternatively from about 5% to about 25%, alternatively from about 10% to about 20%. The average number of hydroxyl groups oxidized per oxidized monosaccharide may range from about 1 to about 3, alternatively from about 1.5 to about 2.0. In some embodiments, the polysaccharide composition may be oxidized to generate aldehyde, ketone and carboxylate groups. The ratio of these groups will vary depending on the reaction conditions and may be adjusted by one of ordinary skill in the art to meet the needs of the user.

In an embodiment, the oxidized polysaccharide may be contacted with a sulfonating agent. The sulfonating agent may be any material capable of reacting with the oxidized polysaccharide to generate sulfonate groups. Sulfonating agents are known to one of ordinary skill in the art and include for example and without limitation sodium sulfite. Without wishing to be limited by theory, aldehyde and ketone groups of the oxidized polysaccharide may react with the sulfonating agent to generate sulfonate groups chemically bonded to the modified polysaccharide as pendant groups.

The number of carboxylate groups present in the additive composition may be increased by contacting the oxidizing agent with the polysaccharide composition under conditions that allow for the maximum conversion of aldehyde functionalities to carboxylates. Alternatively, the number of carboxylate groups present in the additive composition may be decreased by contacting the oxidizing agent with the polysaccharide composition under conditions that allow for the minimum conversion of aldehyde functionalities to carboxylates. Alternatively, the reaction conditions may be adjusted so as to allow for the maximum number of sulfonate groups to be present in the final formulation of the additive composition. Conditions that allow for the maximum production of carboxylates or alternatively for the maximum production of sulfonates may require adjustments of parameters such as the reaction time and temperature and would be known to one of ordinary skill in the art. In either embodiment, the additive composition comprises both carboxylate and sulfonate functionalities.

The additive composition comprising a polysaccharide having a number of carboxylate groups and a number of sulfonate groups in water may be used in a wellbore servicing fluid without further processing.

Alternatively, the additive composition may be further processed such as for example by drying to have the solvent (e.g., water) removed and form a solid which may be stored and used at some later time in a wellbore servicing fluid. Alternatively, the additive composition may be suspended (for example, in a non-aqueous solvent) or remain suspended or dissolved in a solvent (e.g., water) for storage and use at some later time in a wellbore servicing fluid. Hereafter, the additive composition refers to the carboxylated, sulfonated polysaccharide composition whether used as is following preparation or processed (e.g., solvent removal) and used at some later time.

The additive composition may be included in the wellbore servicing fluid (e.g., cement) wherein it may perform any number of functions. In an embodiment, the additive composition prepared as described comprises a carboxylated, sulfonated polysaccharide having x number of carboxylate functionalities and y number of sulfonate functionalities wherein x and y are greater than 1. The ratio of carboxylate functionalities to sulfonate functionalities, x/y, may determine the utility of the composition for a particular application. In an embodiment, the x/y ratio may range from about 0.1 to about 4 as determined by infrared spectroscopy by dividing the ratio of peak heights at 1596.8 $cm^{-1}$ to 624.8 $cm^{-1}$. For example, increasing the number of carboxylate functionalities (for example, x/y ratio>2) may result in an increase in the retarding capabilities of the composition. Alternatively, increasing the number of sulfonate functionalities (for example x/y ratio<2 may result in a composition more suitable for use as a fluid loss agent or a dispersant. The exact ratio of carboxylate to sulfonate in the additive composition necessary to produce a desired effect may be adjusted as disclosed herein by one of ordinary skill in the art to meet the needs of the user.

In an embodiment, the additive composition functions as a dispersant. Dispersants are used to reduce the apparent viscosities of the cement compositions in which they are utilized. The reduction of the viscosity of a cement composition allows the cement composition to be pumped with less friction pressure and utilizing less pump horsepower. In addition, the lower viscosity often allows the cement composition to be pumped in turbulent flow. Turbulent flow characteristics are desirable when pumping cement compositions in wells to more efficiently remove drilling fluid from surfaces in the well bore as the drilling fluid is displaced by the cement composition being pumped. The inclusion of dispersants in cement compositions is also desirable in that the presence of the dispersants facilitates the mixing of the cement compositions and reduces the water required for the cement compositions. Cement compositions having reduced water content are characterized by improved compressive strength development.

In an embodiment, the additive composition functions as a fluid loss control agent. Fluid loss control agents are used in well cement compositions to reduce fluid loss from the cement compositions to permeable formations or zones into or through which the cement compositions are pumped. In primary cementing, the loss of fluid, i.e., water, to permeable subterranean formations or zones can result in premature gelation of the cement composition whereby bridging of the annular space between the permeable formation or zone and the pipe string being cemented prevents the cement composition from being placed over the entire length of the annulus.

In an embodiment, the additive composition functions as a gelation inhibitor and/or a transition time modifier. Gelation inhibitors and/or transition time modifiers may be included in cement compositions to prevent the premature gelation of said compositions or unwanted gas or water migration through the cement slurry. Gas migration is caused by the behavior of the cement slurry during a transition phase in which the cement slurry changes from a true hydraulic fluid to a highly viscous mass showing some solid characteristics. When first placed in the annulus, the cement slurry acts as a true liquid and thus transmits hydrostatic pressure. However, during the transition phase, which is typically the time ranging from when the gel strength of the slurry is about 100 lbf/100 $ft^2$ (pound force per hundred square foot) to when it is about 500 lbf/100 $ft^2$ certain events occur that cause the cement slurry to lose its ability to transmit hydrostatic pressure. One of those events is the loss of fluid from the slurry to the subterranean zone. Another event is the development of static gel strength, i.e., stiffness, in the slurry. As a result, the pressure exerted on the formation by the cement slurry falls below the pressure of the gas in the formation such that the gas begins to migrate into and through the cement slurry. The gas migration causes flow channels to form in the cement slurry. Eventually the gel strength of the cement slurry increases to a value sufficient to resist the pressure exerted by the gas in the formation against the slurry. The cement slurry then sets into a solid mass. Unfortunately, the flow channels formed in the cement during such gas or water migration remain in the cement once it has set. Those flow channels can permit further migration of gas or water through the cement even long after the cement is set. Thus, the addition of a gelation inhibitor and/or transition time modifier may allow the cement residing in the annulus to effectively maintain isolation of the adjacent subterranean formation.

In an embodiment, the additive compositions of this disclosure may be present in a wellbore servicing fluid in an amount of from about 0.1 to about 4%, alternatively of from about 0.2 to about 3%, alternatively of from about 0.3 to about 2% by weight of water, for example in water-based drilling fluids or by weight of cement in the case of cement slurries.

The additive compositions disclosed herein can be included in any wellbore servicing fluid (WSF) which may in turn be used for any purpose. In an embodiment, the WSFs are used to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the WSF in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the wellbore and an expandable pipe or pipe string. For instance, the WSF may viscosify in a loss-circulation zone and thereby restore circulation. The viscosified mixture can set into a flexible, resilient and tough material, which may prevent further fluid losses when circulation is resumed. The WSF may withstand substantial amounts of pressure, e.g., the hydrostatic pressure of a drilling fluid or cement slurry, without being dislodged or extruded. The WSF may provide a relatively viscous mass inside the loss-circulation zone. The WSF can also form a non-flowing, intact mass inside the loss-circulation zone. This mass plugs the zone and inhibits loss of subsequently pumped drilling fluid, which allows for further drilling. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the WSF may be employed in well completion operations such as primary and secondary cementing operations. Said fluids may be placed into an annulus of the wellbore and allowed to set such that it isolates the subterranean formation from a different portion of the wellbore. The WSF thus form a barrier that prevents fluids in that subterranean formation from migrating into other subterranean formations. Within the annulus, the fluid also serves to support a conduit, e.g., casing, in the wellbore.

In an embodiment, the wellbore in which the WSFs are positioned belongs to a multilateral wellbore configuration. It is to be understood that a multilateral wellbore configuration includes at least two principal wellbores connected by one or more ancillary wellbores. In secondary cementing, often referred to as squeeze cementing, the WSF may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a WSF in a wellbore are described in U.S. Pat. Nos. 5,346,012 and 5,588,488, which are incorporated by reference herein in their entirety.

Additive compositions such as those disclosed herein may be introduced to cementitious materials which may comprise a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of cements are disclosed in U.S. Pat. Nos. 6,457,524; 7,077,203; and 7,174,962, each of which is incorporated herein by reference in its entirety. In an embodiment, the cement comprises a Sorel cement composition, which typically comprises magnesium oxide and a chloride or phosphate salt which together form for example magnesium oxychloride. Examples of magnesium oxychloride cements are disclosed in U.S. Pat. Nos. 6,664,215 and 7,044,222, each of which is incorporated herein by reference in its entirety.

The cementitious material may further comprise water. In an embodiment, the cementitous material includes a sufficient amount of water to form a pumpable slurry. The water may be fresh water or salt water, e.g., an unsaturated aqueous salt solution or a saturated aqueous salt solution such as brine or seawater. In embodiments, the cement slurry may be a lightweight cement slurry containing density-reducing additives such as for example foam (e.g., foamed cement) and/or hollow beads/microspheres.

In an embodiment, an additive composition prepared as disclosed herein may be introduced to a cementitious material and decrease the transition time of said material such that the cement exhibits right angle set. Right angle set refers to cement compositions that exhibit a relatively constant viscosity for a period of time after they are initially prepared and while they are being placed in their intended locations in the wellbore, i.e., during the period when the slurry is in motion. Eventually, the cement compositions quickly set such that the viscosity increases from about 35 Bc to equal to or higher than 70 Bc in a short period of time (i.e. less than about 1 hour). This sudden jump in viscosity may be very desirable in preventing unwanted events such as gas or water migration into the slurry because it indicates the quick formation of an impermeable mass from a gelled state after placement. Such cement compositions are called "Right Angle Set Cement Compositions" in reference to the near right angle increase shown in a plot of viscosity v. time.

In an embodiment, an additive composition of the type disclosed herein is prepared at the site of use and/or just prior to use such that the composition is not stored for a duration of time equal to or less than about 1, 2, 3, 4, 5, 6, 7, 8, 9, 10, 11, 12 24, or 48 hours from production. For example, an additive composition may be prepared by transporting a polysaccharide, an oxidizing agent and a sulfonating agent to a wellsite. The polysaccharide (e.g. starch) may be contacted with a solvent such as for example water and subsequently contacted with an oxidizing agent (e.g. sodium percarbonate). The mixture may be allowed to react under conditions that allow for the formation of carboxylate groups. The mixture may then be contacted with a sulfonating agent (e.g. sodium sulfite) and reacted to allow for the formation of sulfonate groups. The exact reaction conditions for formation of either carboxylate or sulfonate groups may be varied by one of ordinary skill in the art to adjust the relative ratio of carboxylates and sulfonates produced as has been described previously herein.

The resultant mixture may be added to a wellbore servicing fluid (e.g. cementitious slurry) which may then be placed in the wellbore.

The additive composition when prepared as described herein and the materials used to prepare the additive composition may be classified as substances that Pose Little Or NO Risk (PLONOR) to the environment or as "Readily Biodegradable" with a biodegradability of greater than 20% in 68 days when the biodegradability tests are performed according to Organization for Economic Cooperation and Development (OECD) test protocols for OECD 302 and/or OECD 306 procedures and whose environmental effects (e.g., toxicity) are considered to be well known. Furthermore, the additive compositions are biodegradable and as such may undergo degradation over time if accidentally released into the environment or intentionally discharged into the environment for disposal.

EXAMPLES

The invention having been generally described, the following examples are given as particular embodiments of the invention and to demonstrate the practice and advantages thereof. It is understood that the examples are given by way of illustration and are not intended to limit the specification.

Example 1

Additive compositions were prepared according to the following procedures: 30 g starch (Cargill Dry MD 01960) was dissolved in 100 mL of water using a blender and to this solution was added 5.8 g sodium percarbonate ($Na_2CO_3.1.5H_2O_2$) and stirred to mix the solution. To this solution 60 mg of $FeSO_4.7H_2O$ was added and mixed. The solution turned red-brown due to the formation of $Fe^{3+}$ salt. The solution was stirred at room temperature for either 1 or 2 hours. The solution turned optically clear during stirring. To this solution was added 5 g sodium sulfite and the solution was then heated at 75° C. for 1 hour. During the heating of the solution, color changes occurred with the final solution having a blue-black color and yielding the desired product. The concentration of the active polymer content was estimated to be 32%. The sample that was stirred at room temperature for 1 hour is referred to as the "1 hr sample" while the sample stirred at room temperature for 2 hours is referred to as the "2 hr sample".

Example 2

Figure 2:
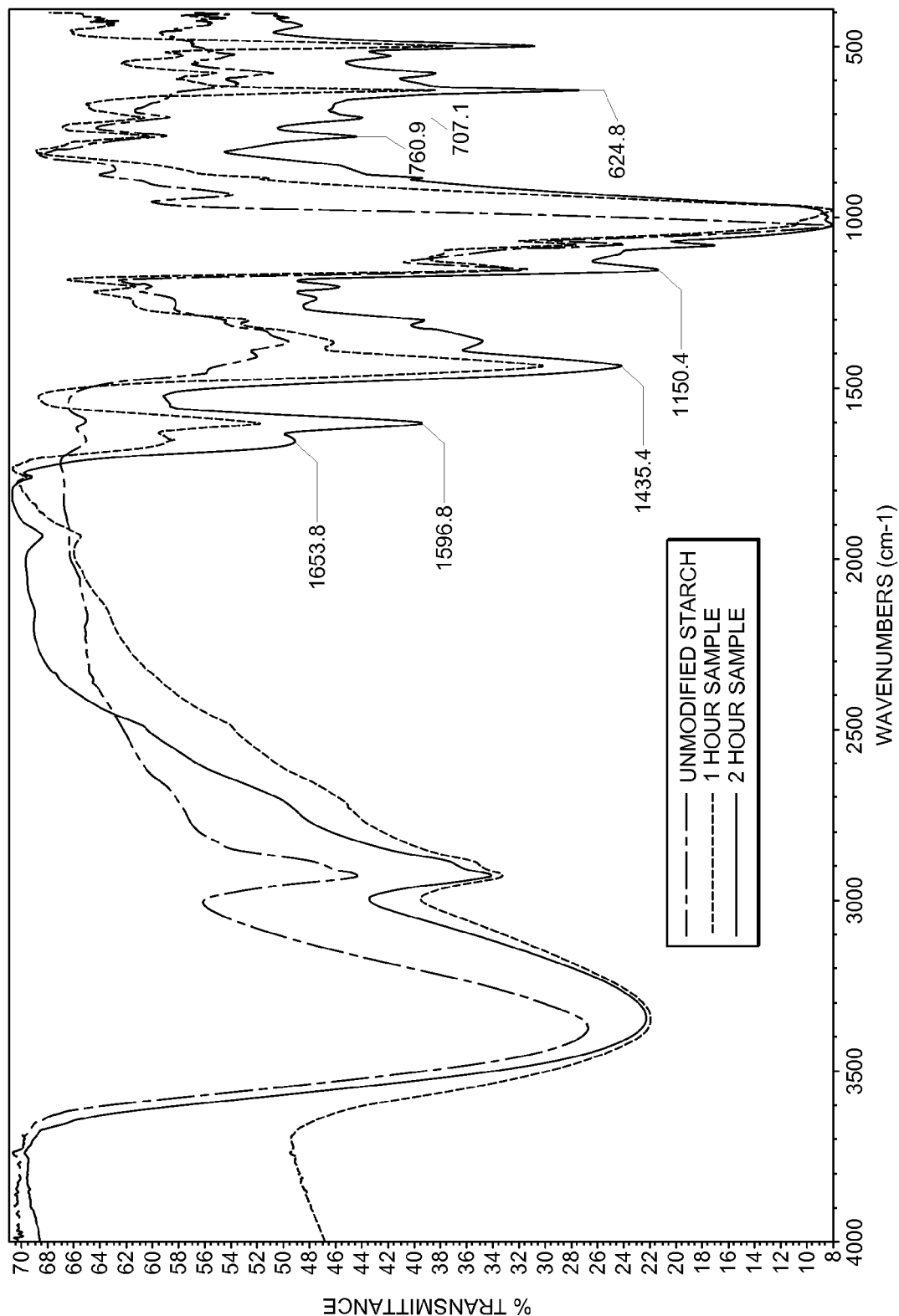
FIG. 2 is the FTIR spectra of the starch samples from Example 1.

The ratio of carboxylate groups to sulfonate groups for the 1 hr and 2 hr samples were determined by Fourier transform infrared spectroscopy (FTIR). FTIR spectra of the 1 hr and 2 hr samples along with a control sample comprising an unmodified starch composition are shown in FIG. 2. The results demonstrate that the extent of carboxylation and sulfonation and the ratio of carboxylate to sulfonate groups in a polysaccharide composition can be determined by measuring changes in the FTIR spectra of the composition. Specifically, the carboxylate group has a characteristic absorption band at a frequency of 1596.8 $cm^{-1}$ while the sulfonate group has a characteristic absorption band at a frequency of 624.8 $cm^{-1}$. The presence of these absorption bands and their relative intensities can be used to determine the ratio of carboxylate to sulfonate groups in the composition. The respective band heights in the FTIR spectra (FIG. 2) were measured and those values are presented in Table 1.

TABLE 1

| Composition | Peak Height @ 1596.8 $cm^{-1}$ | Peak height @ 624.8 $cm^{-1}$ | 1596.8 $cm^{-1}$/ 624.8 cm−1 ratio |
| --- | --- | --- | --- |
| Unmodified Starch | 0.5 | 2 | 4 |
| 1 hr sample | 1.7 | 4 | 2.35 |
| 2 hr sample | 2.8 | 5.3 | 1.89 |

The results demonstrate that with increased time of exposure to the oxidizing agent (i.e., sodium percarbonate) the carboxylate as well as the sulfonate content of the starch increases. Furthermore, the ratio of the sulfonate to carbonate can be adjusted by adjusting the reaction conditions thus demonstrating the flexibility in the product structure design and as a result the flexibility in performance optimization.

Example 3

Figure 3:
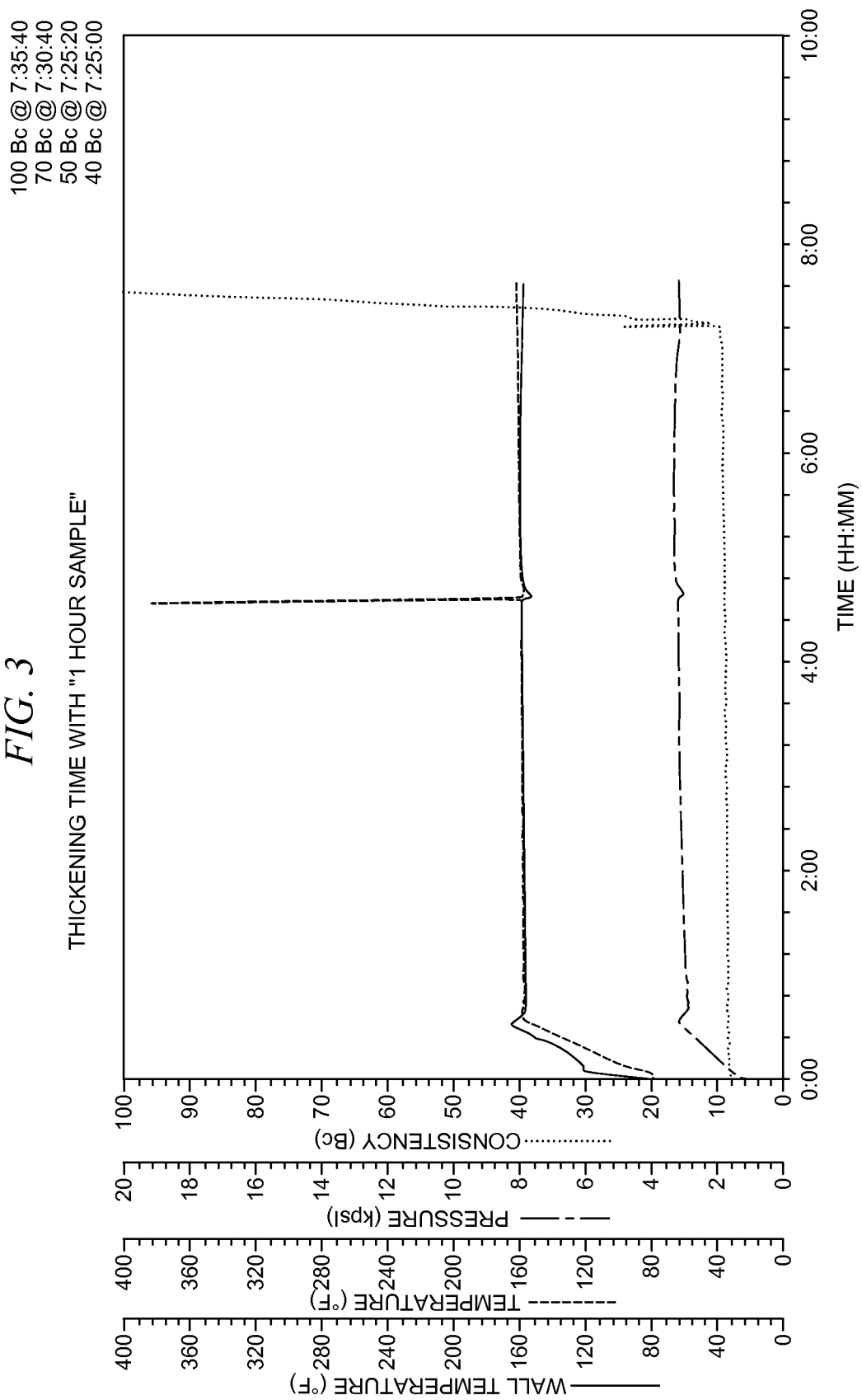
FIGS. 3 and 4 are thickening time plots of the cement samples from Example 1.
Figure 4:
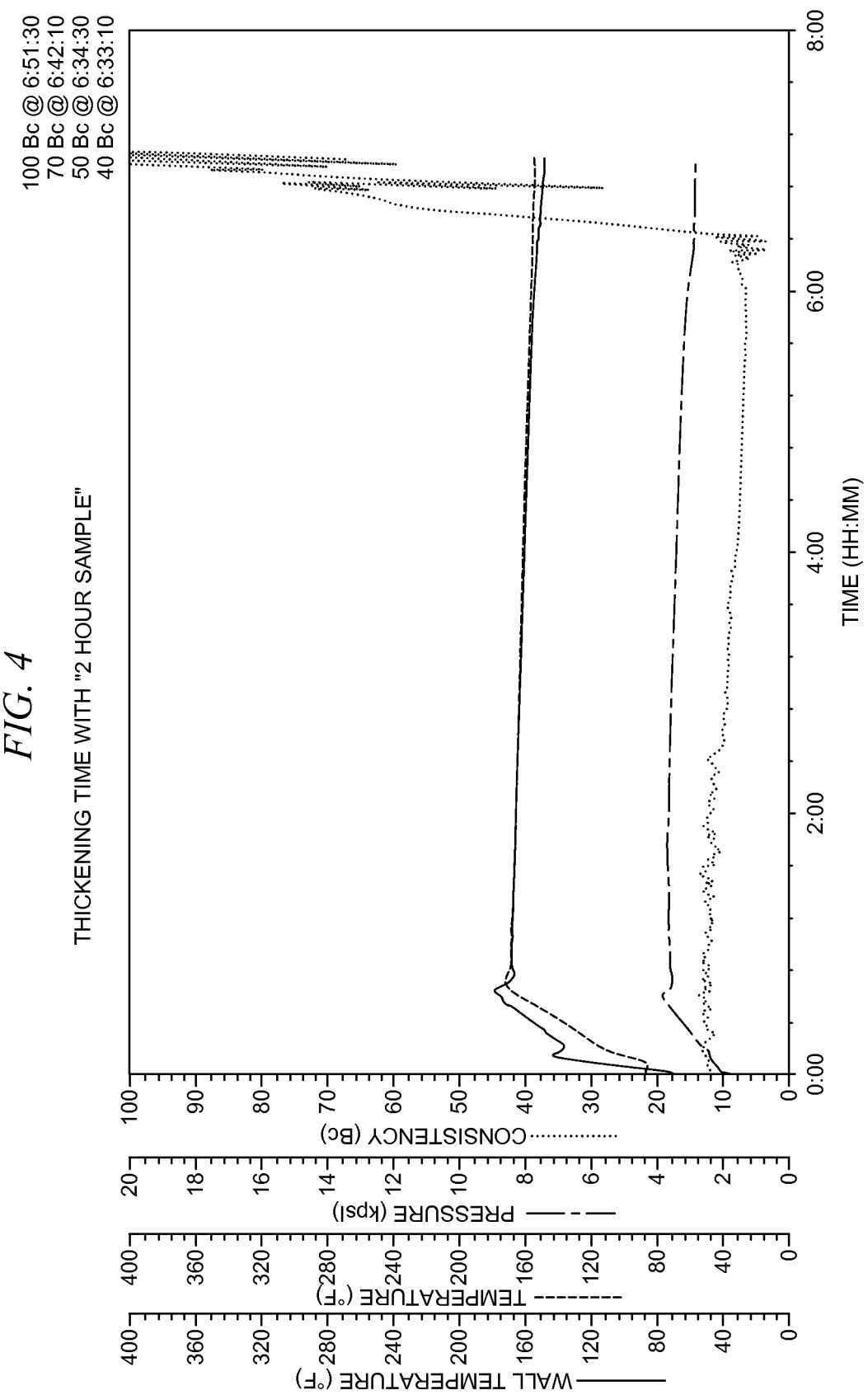

The effect of the additive compositions of this disclosure on the thickening time of a cement composition was investigated. Five samples of Class H cement slurry comprising cement, sufficient water and additive composition of the present disclosure to generate slurries with a density of 16.4 pounds per gallon were prepared and designated Slurries #1-5. Slurry #1 was a control sample containing no additive composition while Slurry #5 contained the conventional dispersant, CFR-3 cement dispersant which is a particle dispersing agent commercially available from Halliburton Energy Services. Slurries #2-4 contained the additive compositions prepared as described in Example 1 and designated as 1 hr Sample and 2 hr Sample. The amounts of additive composition or CFR-3 cement dispersant used are given in Table 2. The thickening time refers to the time required for the composition to achieve 70 Bearden units of Consistency (Bc). At about 70 Bc, the slurry undergoes a conversion from a pumpable fluid state to a non-pumpable paste. The thickening time of the slurries were measured in accordance with API 10B. Thickening time charts for the 1 hr and 2 hr sample at 0.1% by weight of cement (bwoc), Slurry #2 and Slurry #3, are shown in FIGS. 3 and 4.

TABLE 2

| Slurry # | Additive Composition | Amount (% bwoc) | Thickening Time Hours:minutes |
| --- | --- | --- | --- |
| 1 | None | 0 | 1:34 |
| 2 | 1 hr sample | 0.1 | 7:30 |
| 3 | 2 hr sample | 0.1 | 6:42 |
| 4 | 2 hr sample | 0.05 | 2:40 |
| 5 | CFR-3 cement dispersant | 0.1 | 2:40 |

The results demonstrate that the additive compositions of this disclosure (Slurries #2, #3, and #4) can function as set retarders at low concentrations of material.

Example 4

The ability of the additive composition to function as a cement dispersant was investigated. Specifically cementitious slurries were prepared by mixing Class H cement with sufficient amount of fresh water to form a pumpable slurry of density 16.4 pounds per gallon. Control samples were prepared containing either no added dispersant or CFR-3 cement dispersant. The sample compositions are shown in Table 2. The rheological properties of the sample cement compositions were determined, in duplicate, in accordance with *Rec-* ommended Practice for Testing Well Cements, API Recommended Practice 10B, 22nd Edition, December 1997, of the American Petroleum Institute and are presented in Table 3.

TABLE 3

| | Viscosity, cp | | | | | | | | | |
|---|---|---|---|---|---|---|---|---|---|---|
| RPM | Control Run #1 | Control Run #2 | Slurry #2 Run #1 | Slurry #2 Run #2 | Slurry #3 Run #1 | Slurry #3 Run #2 | * Slurry #4 Run #1 | * Slurry #4 Run #2 | Slurry #5 Run #1 | Slurry #5 Run #2 |
| 300 | 82 | 82 | 41 | 41 | 38 | 38 | 46 | 46 | 56 | 56 |
| 200 | 66 | 72 | 29 | 30 | 28 | 28 | 34 | 35 | 38 | 48 |
| 100 | 50 | 55 | 17 | 18 | 16 | 16 | 22 | 23 | 26 | 31 |
| 60 | 43 | 47 | 12 | 13 | 12 | 12 | 17 | 18 | 20 | 25 |
| 30 | 38 | 39 | 9 | 9 | 8 | 8 | 8 | 13 | 17 | 20 |
| 10 | 26 | 29 | 5 | 5 | 5 | 5 | 9 | 9 | 13 | 16 |
| 6 | 21 | 23 | 4.8 | 4.8 | 5.3 | 4.8 | 9 | 9 | 10.3 | 14.9 |
| 3 | 17 | 16 | 4.4 | 4.4 | 4.8 | 4.3 | 7.5 | 7.5 | 7.5 | 11.6 |

* The amount of 2 hr Sample, Slurry #3, was cut in half

The results demonstrate that the additive compositions of this disclosure, 1 hr and 2 hr Samples (i.e. Slurries #2-4), are much stronger dispersants when used at amounts equal to that of the conventional dispersant CFR-3 cement dispersant. At half the weight percentage of CFR-3, the 2 hr Sample, Slurry #4, was as effective a dispersant demonstrating that the additive compositions of this disclosure may be more cost effective as they require only small quantities of materials to achieve good dispersion.

Example 5

The ability of the additive compositions of this disclosure to function as gelation inhibitors was investigated. Four samples of a cementitious slurry corresponding to first four slurries in Table 2 were prepared. A control sample, Slurry #1, contained no additive while Slurries #2-4 contained either 1 hr Sample or 2 hr Sample in the amounts indicated in Table 4. The time needed for the slurry to transition from a viscosity of 40 Bearden units of consistency (Bc) to 70 Bc and the time needed for the slurry's viscosity to increase from 70 Bc to 100 Bc were measured and those values are also presented in Table 4.

TABLE 4

| Slurry # | Additive | Additive amount (% bwoc) | Time needed from 40 Bc to 70 Bc | Time needed from 70 Bc to 100 Bc |
|---|---|---|---|---|
| 1 | None | 0 | 7 | 10 |
| 2 | 1 hr Sample | 0.1 | 5 | 5 |
| 3 | 2 hr Sample | 0.1 | 9 | 9 |
| 4 | 2 hr Sample | 0.05 | 18 | 11 |

The results demonstrate the ability of the additive compositions of this disclosure to minimize gel formation under dynamic conditions. The additive compositions of this disclosure have a very short duration between a slurry viscosity of 40 Bc to 70 Bc and 70 Bc to 100 Bc thus; the slurries are expected to exhibit Right Angle Set Behavior. This is also shown in FIG. 5 which is the thickening time chart of the 2 hr Sample, Slurry #4, at an amount of 0.05% bwoc.

Example 6

Compositions of sulfite adducts of oxidized starch were prepared according to the procedures described in U.S. Published Application No. 2005-0274291A1, hereinafter '291, using sodium periodate as the oxidizer. A portion of these solutions were exposed to air and another portion was left in partially-filled, closed bottles. The air exposed solution discolored quickly within a week and lost their ability to act as cement slurry dispersants. The solution kept in a partially-filled bottle discolored slowly over a period of about a month and lost their effectiveness to disperse cement slurries. The carboxylated, sulfonated polysaccharide products of present disclosure did not lose their color even after 3 months of storage in a partially-filled, closed bottle thus demonstrating longer shelf life. Without wishing to be limited by theory, the results suggest that the compositions described in '291 may be breaking down because of the presence of active by-products of the oxidizing agent used (for example, iodate salt) and/or the reaction product is of a different chemical nature that is air sensitive thus limiting its use. It is believed that the reaction product described in '291, sulfite ion forms a charge-transfer type of adduct with an aldehyde group, whereas in the present disclosures it forms a full-fledged covalent sulfonate group by the addition of sulfite group to a carbonyl group of ketone or an aldehyde group.

Collectively Examples 1-6 demonstrate that the additive compositions of this disclosure can be included in wellbore servicing fluids to control parameters such as thickening time, rheology and gelation. The additive compositions of this disclosure are prepared using a simple method involving contacting polysaccharides, an oxidizing agent and a sulfite salt to produce carboxylated, sulfonated polysaccharide compositions which can be produced on site for immediate use or stored for later use.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of preparing a wellbore servicing fluid comprising:
    forming an oxidized polysaccharide by contacting a polysaccharide composition with an oxidizing agent and oxidatively cleaving at least one chemical bond of the polysaccharide selected from the group consisting of a glycosidic linkage and a hydroxylated carbon-carbon bond, wherein the oxidizing agent comprises a material with the general formula $Y.nH_2O.mH_2O_2$ wherein Y is a salt, n is equal to or greater than zero and m is equal to or greater than 1;
    contacting the oxidized polysaccharide with a sulfonating agent to form a carboxylated sulfonated polysaccharide; and
    contacting the carboxylated sulfonated polysaccharide with a wellbore servicing fluid.

2. The method of claim 1 wherein the wellbore servicing fluid comprises cement slurries, non-cementitious sealants, drilling fluids or muds, spacer fluids, fracturing fluids, completion fluids or combinations thereof.

3. The method of claim 1 further comprising removing the solvent from the carboxylated sulfonated polysaccharide to form a solid additive composition.

4. The method of claim 1 wherein the carboxylated sulfonated polysaccharide is contacted with the wellbore servicing fluid in equal to or less than about 48 hours after production of the carboxylated sulfonated polysaccharide.

5. The method of claim 1 wherein the carboxylated sulfonated polysaccharide has a biodegradability of greater than 20% in 68 days when the biodegradability tests are performed according to Organization for Economic Cooperation and Development (OECD) test protocols for OECD 302 and/or OECD 306 procedures.

6. The method of claim 1 wherein the wellbore servicing fluid comprises a cementitious material.

7. The method of claim 3 wherein the wellbore servicing fluid comprises a cementitious material and the additive composition is introduced to the cementitious material.

8. The method of claim 1 wherein the polysaccharide comprises a starch, a galactomannan gum, a cellulose, or combinations thereof.

9. The method of claim 8 wherein the galactomannan gum comprises guar gum, locust bean gum, gum ghatti, gum karaya, tamarind gum, tragacanth gum, or combinations thereof.

10. The method of claim 1 wherein the polysaccharide comprises maltodextrin.

11. The method of claim 1 wherein the oxidizing agent comprises sodium percarbonate.

12. The method of claim 1 wherein the sulfonating agent comprises sodium sulfite.

13. The method of claim 1 wherein the oxidizing agent comprises sodium percarbonate and the sulfonating agent comprises sodium sulfite.

14. The method of claim 6 wherein the polysaccharide comprises guar gum, locust bean gum, gum ghatti, gum karaya, tamarind gum, tragacanth gum, or combinations thereof, the oxidizing agent comprises sodium percarbonate and the sulfonating agent comprises sodium sulfite.

15. The method of claim 6 wherein the polysaccharide comprises maltodextrin, the oxidizing agent comprises sodium percarbonate and the sulfonating agent comprises sodium sulfite.

16. The method of claim 1 wherein the carboxylated sulfonated polysaccharide has a ratio of carboxylate functionalities to sulfonate functionalities in a range from about 0.1 to about 4 as determined by infrared spectroscopy by dividing the ratio of peak heights at 1596.8 $cm^1$ to 624.8 $cm^{-1}$.

17. The method of claim 6 wherein the carboxylated sulfonated polysaccharide is present in the wellbore servicing fluid in an amount of from about 0.1 to about 4% by weight of the cementitious material.

18. The method of claim 6 wherein the wellbore servicing fluid exhibits right angle set.

19. The method of claim 1 further comprising forming an iron salt from the oxidized polysaccharide prior to contact with the sulfonating agent.

20. The method of claim 1, wherein the oxidized polysaccharide has at least one acyclic monosaccharide fragment.

21. The method of claim 1, wherein the oxidized polysaccharide has at least one ketone group, anhydride group, ester group, or combinations thereof.

* * * * *

UNITED STATES PATENT AND TRADEMARK OFFICE
CERTIFICATE OF CORRECTION

PATENT NO. : 8,513,167 B2
APPLICATION NO. : 13/460533
DATED : August 20, 2013
INVENTOR(S) : B. Raghava Reddy et al.

Page 1 of 1

It is certified that error appears in the above-identified patent and that said Letters Patent is hereby corrected as shown below:

In the Claims

Column 14, Line 36; Replace: "1596.8 cm$^1$" with --1596.8 cm$^{-1}$--

Signed and Sealed this
Twenty-ninth Day of October, 2013

Teresa Stanek Rea
*Deputy Director of the United States Patent and Trademark Office*